Oct. 24, 1950         J. R. MILES         2,527,370
OPTICAL SYSTEM FOR PHOTOGRAPHIC OBJECTIVES
Filed April 11, 1949

INVENTOR.
John R. Miles

UNITED STATES PATENT OFFICE

2,527,370

OPTICAL SYSTEM FOR PHOTOGRAPHIC OBJECTIVES

John R. Miles, Des Plaines, Maine Township, Cook County, Ill., assignor to La Croix Optical Company, Chicago, Ill., a corporation of Illinois Application April 11, 1949, Serial No. 86,659

6 Claims. (Cl. 88—57)

The present invention relates generally to optical devices, and, more particularly, to improvements in optical devices, such as photographic objectives, or the like.

Heretofore, in the manufacture of optical systems, such as those for photographic objectives, or the like, having a high quality image and sufficient relative aperture for colored pictures, the systems were too expensive to manufacture for low-priced cameras, etc., and, previously when a low-cost optical system was devised, the quality of the image was not sufficient for use on cameras of the sub-miniature class, or the relative aperture was not sufficiently high for colored pictures.

Accordingly, it is an object of the present invention to provide a novel means whereby a photographic objective, which has a higher quality image and a good relative aperture, can be produced with inexpensive glass, and of inexpensive construction.

Another and more specific object is to provide a novel optical system comprising an achromatic two-element lens, and a stop between the said lens and the focal plane, whereby an image covering a moderate field can be produced with a higher resolving power without involving high cost.

Another specific object is to provide a novel optical system for photographic objectives, or the like, in which ordinary window glass is used for the front element, ordinary inexpensive flint glass for the rear element, and relatively long radii of curvatures for the refracting surfaces, whereby, in combination with a stop behind the lens, an image covering a moderate field and having a higher resolving power is formed.

The above, and other objects and advantages of the present invention, will appear more fully hereinafter from a consideration of the detailed description and claims which follow, taken together with the accompanying drawings, wherein one embodiment of the invention is illustrated. It is to be expressly understood, however, that the drawings are for the purpose of illustration only, and not designed as a definition of the limits of the invention. Reference for this latter purpose should be had to the appended claims.

Figure 1:
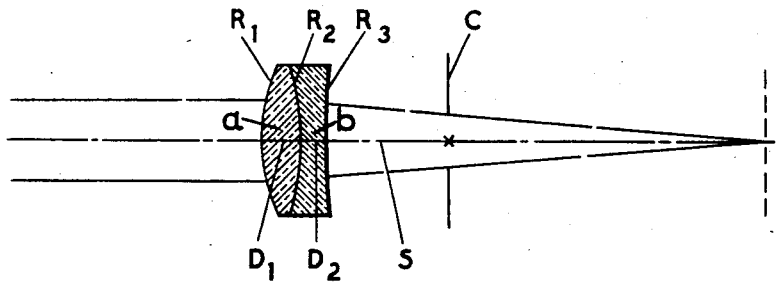

In the drawings wherein like reference characters refer to like parts throughout both views, Figure 1 is a side axial section view of the optical system construction.

Figure 2:
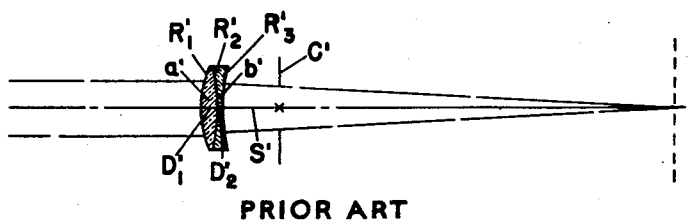

Figure 2 illustrates the lens of the same focal length of the prior art in which the radii of curvatures of the surfaces are shorter than in the embodiment shown in Figure 1, and the resolution is not as good over a moderate field.

In both figures the stop and the image plane are shown.

The one embodiment illustrated includes a double convex crown front element $a$, and a double concave rear flint element $b$, as well as an aperture stop C, both of said elements designed and shaped according to the following table:

| Lens Elements | Radii | Thicknesses | Refractive Indices—$N_D$ | V |
|---|---|---|---|---|
| $a$ | $R_1=+35.01$ | $D_1=7.87$ | 1.516 | 59.1 |
| | $R_2=-50.70$ | $D_2=5.25$ | 1.617 | 36.6 |
| $b$ | $R_3=+187.36$ | | | | in which the relative aperture is F:6.3 approximately; and in which $R_1$, $R_2$, and $R_3$ are radii of curvature; $D_1$ and $D_2$ are center thicknesses of the lens elements; $V=(N_D-1)/(N_F-N_C)$, where $N_D$, $N_F$ and $N_C$ respectively are the indices of refraction in the standard D, F and C Fraunhofer spectral lines. Equivalent focal length equals 100 units. The above figures are for a photographic objective, or the like, in which the distance S to the aperture stop from the back vertex of the lens is 24.36 units, and the diameter of said aperture stop is 10.12 units. The total field covered is 19°.

The functions of the parts

The front crown element $a$ serves three main functions:

1. To produce positive refracting lens power, and, thus, image-forming ability.

2. To produce chromatic aberration correction by combining its reciprocal dispersion ratio V and its focal length with the corresponding properties of the rear flint element.

3. To produce flattening of the field to the degree required by the difference of the curvatures of its refracting surfaces.

The rear flint element $b$ serves two main functions:

1. To produce chromatic aberration correction by combining its reciprocal dispersion ratio V and its focal length with the corresponding properties of the front crown element.

2. To produce flattening of the field to the degree required by the difference of the curvatures of its refracting surfaces.

In all prior photographic objectives of the type described, the lens elements have had drastically curved surfaces, thereby producing such a large amount of spherical aberration that the resolving power was thereby lessened. In the prior art, to overcome this loss of resolving power, designs were adopted which required expensive glasses in addition to the more expensive drastically curved surfaces and smaller relative apertures. Reference is had to Patent Number 1,643,865 of F. Weidert, Figures 1, 2, and 3, an American patent.

In order to accomplish the result of a higher quality photographic objective at a lower cost, the applicant used ordinary window glass, which was previously considered impractical for optical purposes because of its optical characteristics, combined in a novel way with the least expensive of the flint glasses, which is usually termed ordinary flint. He then reduced the spherical aberration by adopting a picture angle smaller than ordinarily used in still cameras, but which is more satisfactory for portraiture, and which allows a correction as to flatness of field well within the optical tolerances, while the spherical aberration is kept small enough to give an enhanced resolving power.

What is claimed is:

1. An optical system for photographic objectives, or the like, comprising a plurality of lenses in axial alignment substantially according to the following table:

| Lens Elements | Radii | Thicknesses | Refractive Indices—$N_D$ | V |
|---|---|---|---|---|
| a | $R_1 = +35.01$ | $D_1 = 7.87$ | 1.516 | 59.1 |
| | $R_2 = -50.70$ | | | |
| b | | $D_2 = 5.25$ | 1.617 | 36.6 |
| | $R_3 = +187.36$ | | | | in which the relative aperture is F:6.3 approximately; $R_1$, $R_2$ and $R_3$ are radii of curvature; $D_1$ and $D_2$ are center thicknesses of the lens elements; $V = (N_D - 1)/(N_F - N_C)$ where $N_D$, $N_F$, and $N_C$ respectively are the indices of refraction in the standard D, F and C Fraunhofer spectral lines; equivalent focal length is 100 units; distance from the back of the lens to the aperture stop is equal to 24.36 units; the diameter of the aperture stop is 10.12 units, and in which the total field coverage is approximately 19°.

2. An optical system for photographic objectives, or the like, comprising a plurality of lenses in which the first principal refracting surface is convex, and has a radius of curvature between three-tenths and four-tenths of the focal length of the system, and in which the last principal refracting surface is concave and has a radius of curvature greater than one and one-half times the focal length of the system, and in which the rear surface of the first principal element of the system has a radius of curvature between forty-five one hundredths and fifty-five one hundredths of the focal length of the system.

3. The optical system of claim 2, in which the combined thickness of the two principal lens elements of said optical system is between one-tenth and two-tenths of the focal length of the complete system.

4. The optical system in claim 2 in which the $N_D$ of the glass of one of its elements is between 1.500 and 1.520, and in which the $N_D$ of another of its elements is between 1.600 and 1.620, $N_D$ being the refractive index for the line D of the solar spectrum, and in which the overall center thickness of the principal portion of said optical system is between one-tenth and two-tenths of the focal length of the complete system.

5. An optical system for photographic objectives, or the like, in which $N_D$ of the first principal element is between 1.510 and 1.520, and in which the V of the first principal element is between 59 and 60, and in which $N_D$ for the second principal element is between 1.610 and 1.620, and V of the second principal element is between 36.4 and 36.8, $N_D$ being the refractive index for the line D of the solar spectrum, and V being the well known reciprocal dispersion ratio, and in which the radius of curvature of the front surface of the first principal lens element is convex, and is between one-third and three-eighths of the focal length of the system, and in which the rear surface of the second principal lens element is concave, and is between one and three-fourths times and three times the focal length of the system, and in which the second surface of the first principal lens element is convex, and is between four-ninths and five-ninths of the focal length of the complete system.

6. The optical system in claim 5 in which the combined thickness of the two principal elements is between one-tenth and two-tenths of the focal length of the over-all system.

JOHN R. MILES.

REFERENCES CITED

The following references are of record in the file of this patent:

UNITED STATES PATENTS

| Number | Name | Date |
|---|---|---|
| 415,040 | Hastings | Nov. 12, 1889 |
| 442,251 | Gundlach | Dec. 9, 1890 |
| 576,896 | Rudolph | Feb. 9, 1897 |
| 1,643,865 | Weidert | Sept. 27, 1927 |

FOREIGN PATENTS

| Number | Country | Date |
|---|---|---|
| 4,366 | Great Britain | of 1905 |